(12) United States Patent
Rock et al.

(10) Patent No.: US 8,129,296 B2
(45) Date of Patent: *Mar. 6, 2012

(54) VELOUR FABRIC ARTICLES HAVING IMPROVED DYNAMIC INSULATION PERFORMANCE

(75) Inventors: Moshe Rock, Andover, MA (US); Edward P. Dionne, South Paris, ME (US); Bhupesh Dua, Haverhill, MA (US); Charles Haryslak, Haverhill, MA (US); William K. Lie, Methuen, MA (US); Douglas Lumb, Methuen, MA (US)

(73) Assignee: MMI-IPCO, LLC, Lawrence, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/941,755

(22) Filed: Nov. 8, 2010

(65) Prior Publication Data

US 2011/0052860 A1    Mar. 3, 2011

Related U.S. Application Data (63) Continuation of application No. 12/016,960, filed on Jan. 18, 2008, now Pat. No. 7,829,172, which is a continuation of application No. 09/982,720, filed on Oct. 18, 2001, now abandoned, which is a continuation-in-part of application No. 09/347,825, filed on Jul. 2, 1999, now abandoned.

(51) Int. Cl.
*D04B 1/18* (2006.01)
*D04B 1/16* (2006.01)
*B32B 33/00* (2006.01)

(52) U.S. Cl. ......... 442/306; 442/310; 442/312; 428/91; 428/92; 428/95; 428/96

(58) Field of Classification Search ............... 428/85, 428/91, 92, 95, 96; 442/306, 310, 312
See application file for complete search history.

(56) References Cited

U.S. PATENT DOCUMENTS 2,144,514 A    1/1937    Speh
(Continued)

FOREIGN PATENT DOCUMENTS

EP    0 111 409    6/1984
(Continued)

OTHER PUBLICATIONS

Patents Abstract of Japan; vol. 015, No. 173 (C-0828); May 2, 1991 & JP 03 040845 A; Feb. 21, 1991.

(Continued)

*Primary Examiner* — Jenna Johnson (74) *Attorney, Agent, or Firm* — Fish & Richardson P.C.

(57) ABSTRACT

A velour fabric article consists of a fabric body having a technical face formed by a filament stitch yarn and a technical back formed by a filament loop yarn. The filament stitch yarn includes a heat sensitive material, e.g. a hot melt material or a heat shrinkable material, and/or an elastomeric material, such as spandex. The fabric body has a velour surface formed at at least the technical back. The fabric body has permeability of about 80 ft³/ft²/min, or less, under a pressure difference of ½ inch of water across the fabric body.

16 Claims, 5 Drawing Sheets

U.S. PATENT DOCUMENTS

| | | | |
|---|---|---|---|
| 3,168,883 A | 2/1965 | Ploch et al. | |
| 3,837,943 A * | 9/1974 | Ploch et al. | 156/93 |
| 4,067,209 A | 1/1978 | Kucera et al. | |
| 4,103,518 A * | 8/1978 | Lombardi et al. | 66/107 |
| 4,546,026 A | 10/1985 | Kowalski | |
| 5,520,022 A * | 5/1996 | Callaway | 66/194 |
| 5,557,950 A * | 9/1996 | Richards et al. | 66/194 |
| 5,598,615 A | 2/1997 | Takada | |
| 6,082,147 A | 7/2000 | Rock et al. | |
| 6,164,095 A | 12/2000 | Rock et al. | |
| 6,779,368 B2 | 8/2004 | Rock et al. | |
| 6,782,590 B2 | 8/2004 | Rock et al. | |
| 6,828,003 B2 | 12/2004 | Rock et al. | |
| RE40,314 E | 5/2008 | Rock et al. | |
| RE41,574 E | 8/2010 | Rock et al. | |
| 7,829,172 B2 | 11/2010 | Rock et al. | |
| 2002/0124365 A1 * | 9/2002 | Wood et al. | 26/2 R |

FOREIGN PATENT DOCUMENTS

| | | |
|---|---|---|
| FR | 2 313 486 | 12/1976 |
| FR | 2 512 081 | 9/1982 |
| FR | 2 747 133 | 10/1997 |
| GB | 2 106 153 | 7/1983 |
| WO | WO 00/44969 | 8/2000 |

OTHER PUBLICATIONS

Patent Abstracts of Japan; vol. 1995, No. 11; Dec. 26, 1995 & JP 07 197354A; Aug. 1, 1995.

Canadian Journal of Research; OL. 25, Sec. A; Jul. 1974; No. 4; "The Effect of Wing on the Thermal Resistance of Clothing . . . Various Permeabilities"; P. Larose; pp. 169-190.

ASTM Designation: "Standard Test Method for Air Permeability of Textile Fabrics"; D737-96; pp. 230-234.

International Search Report; EP 03 25 2366; Sep. 2003; P. Van Gelder.

Patent Abstracts of Japan; vol. 1998, No. 03, Feb. 27, 1998; JP 09 302560; Nov. 25, 1997.

European Search Report EP 0 225 7260; D. Sterle; Jan. 15, 2003.

* cited by examiner

VELOUR FABRIC ARTICLES HAVING IMPROVED DYNAMIC INSULATION PERFORMANCE

CROSS REFERENCE TO RELATED APPLICATIONS

This application is a continuation of U.S. application Ser. No. 12/016,960, filed Jan. 18, 2008, now U.S. Pat. No. 7,829,172, issued Nov. 9, 2010, which is a continuation of U.S. application Ser. No. 09/982,720, filed Oct. 18, 2001, now abandoned, which is a continuation-in-part of U.S. application Ser. No. 09/347,825, filed Jul. 2, 1999, now abandoned, the entire disclosures of which are incorporated herein by reference.

TECHNICAL FIELD

This invention relates to velour fabric articles, and, more particularly, to velour fabric articles having improved dynamic insulation performance due to relatively greater densification and tortuosity.

BACKGROUND

Double-face velour fabric articles having opposite fleece or raised surfaces, e.g., achieved by processes of sanding, brushing and/or napping, are known to have good insulation performance under static conditions, i.e., in calm or still air with no wind blowing through the fabric. However, the insulating performance of these fabric articles drops rapidly under dynamic conditions, i.e., in a chilling wind. As a result, a consumer wearing a double-face velour fabric article will often find it necessary to also wear a shell, e.g., of woven nylon or other low permeability material, when conditions are likely to be windy.

It is also known to increase the thermal insulation performance of double-face velour fabric articles by incorporating a relatively coarser stitch yarn and/or by tightening the stitch. However, these approaches result in fabric articles with very poor stretch, increased stiffness and increased weight.

SUMMARY

According to one aspect of the invention, a double-face velour fabric article comprises a fabric body having a technical face formed by a filament stitch yarn and a technical back formed by a filament loop yarn, the filament stitch yarn comprising heat sensitive material, the fabric body having a velour surface formed at both the technical back and the technical face, and the heat sensitive material responding to application of heat during processing to increase tortuosity with a result of the fabric body having permeability of about 80 ft$^3$/ft$^2$/min or less under a pressure difference of ½ inch of water across the fabric body (according to the testing method of ASTM Designation: D 737-96, "Standard Test Method for Air Permeability of Textile Fabrics," the entire disclosure of which is incorporated herein by reference).

Preferred embodiments of this aspect of the invention may include one or more of the following additional features. The heat sensitive material is preferably selected from the group consisting of polypropylene, polyester, and polyamide. The heat sensitive material comprises heat shrinkable material, preferably selected from the group consisting of polyester, polypropylene, and polyamide. The heat sensitive material responds to application of dry heat and/or to application of wet heat, e.g. steam or hot water, e.g. at about 212° F. to about 450° F. applied for about 2 minutes to about 60 minutes. The filament stitch yarn comprises elastomeric material, e.g. spandex. Filaments of the heat sensitive material and filaments of the elastomeric material are commingled or plaited together. The filament stitch yarn is a cored yarn comprising a core and a sheath, the sheath comprising hot melt material. The core material is preferably selected from the group consisting of polyester and nylon, and the hot melt material is preferably selected from the group consisting of polypropylene, polyester and polyamide. The filament loop yarn is split, e.g. by application of heat, e.g. the loop yarn of fine denier fibers or filaments comprises an "islands-in-sea" construction, or by application of a chemical, e.g. caustic soda, or by mechanical action, e.g. napping, to release multiple small diameter filaments. The filament loop yarn and/or the filament stitch yarn is textured. Raised fibers of the velour surface, of at least one of the technical face and the technical back, is entangled, including in and/or through interstices of the fabric body toward the other of the technical face and the technical back. Raised fibers of the technical back are entangled, including in and/or through interstices of the fabric body, toward the technical face.

According to another aspect of the invention, a double-face velour fabric article comprises a fabric body having a technical face formed by a filament stitch yarn and a technical back formed by a filament loop yarn, the filament stitch yarn comprising elastomeric material, the fabric body having a velour surface formed at both the technical back and the technical face, and the fabric body having permeability of about 80 ft$^3$/ft$^2$/min or less under a pressure difference of ½ inch of water across the fabric body.

Preferred embodiments of both of these aspects of the invention may include one or more of the following additional features. The elastomeric material comprises spandex. The fabric body has permeability of about 70 ft$^3$/ft$^2$/min or less. Raised fibers of the velour surface of at least one of the technical face and the technical back is entangled, including in and/or through interstices of the fabric body toward the other of the technical face and the technical back. Preferably, raised fibers of the technical back are entangled, including in and/or through interstices of the fabric body, toward the technical face. At least one of the filament stitch yarn and the filament loop yarn is a yarn of fine denier filaments or fibers.

According to another aspect of the invention, a double-face velour fabric article comprises a fabric body having a technical face formed by a filament stitch yarn and a technical back formed by a filament loop yarn, the fabric body having a velour surface formed at both the technical face and the technical back, with raised fibers of the velour surface of at least one of the technical face and the technical back entangled, including in and/or through interstices of the fabric body toward the other of the technical face and the technical back, the fabric body having permeability of about 80 ft$^3$/ft$^2$/min or less under a pressure difference of ½ inch of water across the fabric body.

According to still another aspect of the invention, a double-face velour fabric article comprises a fabric body having a technical face formed by a filament stitch yarn and a technical back formed by a filament loop yarn, the fabric body having a velour surface formed at both the technical face and the technical back, with the fabric body having permeability of about 80 ft$^3$/ft$^2$/min or less under a pressure difference of ½ inch of water across the fabric body, wherein, after finishing, at least one of the technical face and the technical back is subjected to hydroentanglement to entangle raised fibers of the velour surface, including in and/or through interstices of the fabric body, thereby to densify the fabric body and increase tortuosity.

In preferred embodiments of both aspects of the invention, raised fibers of the technical back are entangled, including in and/or through interstices of the fabric body, toward the technical face, and/or at least one of the filament stitch yarn and the filament loop yarn is a yarn of fine denier filaments or fibers.

According to yet another aspect of the invention, a method of forming a double-face velour fabric body comprises the steps of: joining a filament loop yarn and a filament stitch yarn to form a fabric prebody, the filament stitch yarn forming a technical face of the fabric prebody and the filament loop yarn forming a technical back of the fabric prebody, the filament stitch yarn comprising heat sensitive material, finishing the technical face and the technical back of the fabric prebody, thereby to form a double-face velour fabric body having opposite velour surfaces, and exposing the fabric body to heating sufficient to cause a response by the heat sensitive material, thereby to increase tortuosity with a result of the fabric body having permeability of about 80 $ft^3/ft^2$/min or less under a pressure difference of ½ inch of water across the fabric body.

According to another aspect of the invention, a method of forming a double-face velour fabric body comprises the steps of: joining a filament loop yarn and a filament stitch yarn to form a fabric prebody, with the filament stitch yarn forming a technical face of the fabric prebody and the filament loop yarn forming a technical back of the fabric prebody, finishing the technical face and the technical back of the fabric prebody, thereby to form a double-face velour fabric body having opposite velour surfaces, and entangling raised fibers of at least one of the technical face and the technical back, including in and/or through interstices of the fabric body, thereby to increase density and tortuosity of the fiber body, the fabric body having permeability of about 80 $ft^3/ft^2$/min or less under a pressure difference of ½ inch of water across the fabric body.

Preferred embodiments of this aspect of the invention may include one or more of the following additional features. The method comprises the further step of entangling the raised fibers in a process of hydroentanglement, by directing fine, high-pressure water jets upon at least one of the technical face and the technical back. The method comprises the further step of directing fine, high pressure jets (e.g., water jets or air jets) upon the technical back, to cause raised fibers of the velour surface of the technical back to entangle, including in and/or through interstices of the fabric body, toward the technical face. The filament stitch yarn comprises heat sensitive material, and the method comprises the further step of exposing said fabric body to heating sufficient to cause a response by the heat sensitive material, thereby to increase tortuosity.

Preferred embodiments of both aspects of the invention may include one or more of the following additional features. The method comprises exposing the fabric body to the heating sufficient to cause a response by the heat sensitive material during dyeing and/or during finishing. The method comprises exposing the fabric body to dry heat and/or to wet heat, e.g. steam or hot water. The method comprises exposing the fabric body to heating sufficient to cause a response by the heat sensitive material for about 2 minutes to about 60 minutes at about 212° F. to about 450° F. The method comprises exposing the fabric body to heating sufficient to cause a response by the heat sensitive material, thereby to increase tortuosity with a result of the fabric body having permeability of about 70 $ft^3/ft^2$/min or less. The method comprises joining a filament loop yarn and a filament stitch yarn, the filament stitch yarn comprising elastomeric material, e.g., spandex.

According to still another aspect of the invention, a method of forming a double-face velour fabric body comprises the steps of: joining a filament loop yarn and a filament stitch yarn to form a fabric prebody, the filament stitch yarn forming a technical face of the fabric prebody and the filament loop yarn forming a technical back of the fabric prebody, the filament stitch yarn comprising elastomeric material, e.g., spandex, and finishing the technical face and the technical back of the fabric prebody, thereby to form a double-face velour fabric body having opposite velour surfaces and permeability of about 80 $ft^3/ft^2$/min or less under a pressure difference of ½ inch of water across the fabric body.

An objective of the invention is to provide double-face velour fabric articles having improved dynamic insulation performance while avoiding increased weight and/or loss of stretch and/or loss of flexibility. A further objective is to provide double-face velour fabric articles that may be worn in chilling, windy conditions without markedly diminished insulation performance. Generally, tortuosity, and therefore density, is increased by using heat-sensitive and/or elastomeric materials in the stitch yarns and entangling the loop yarn fibers.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
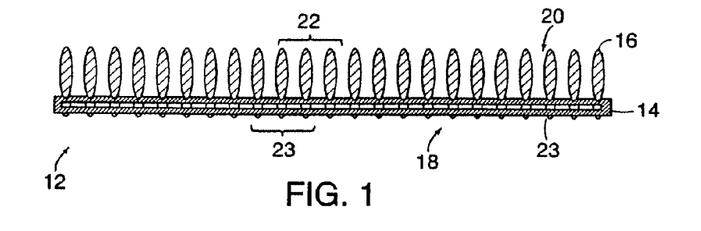
FIG. 1 is a somewhat diagrammatic end section view of a double-face fabric prebody, e.g., as formed in a reverse plaiting circular knitting process.

Referring to FIG. 1, a double-face fabric prebody 12, e.g., for use in forming a double-face velour fabric article 10 of the invention (FIG. 2), is formed by joining a stitch yarn 14 and a loop yarn 16 in a standard reverse plaiting circular knitting (terry knitting) process (see FIGS. 4-11), e.g., as described in Knitting Technology, by David J. Spencer (Woodhead Publishing Limited, 2nd edition, 1996), the entire disclosure of which is incorporated herein by reference. In the terry knitting process, the stitch yarn 14 forms the technical face 18 of the resulting fabric prebody 12 and the loop yarn 16 forms the opposite technical back 20, where it is formed into loops 22. In the fabric prebody 12 formed by reverse plaiting circular knitting, the loop yarn 16 extends outwardly to overlie and cover the stitch yarn 14 at the technical face 18.

The loop yarn 16 forming the technical back 20 of the knit fabric body 12 can be made of any synthetic or natural material. The cross section and luster of the fibers or filaments may be varied, e.g., as dictated by requirements of the intended end use. The loop yarn 16 can be a textured or flat filament or, preferably, a yarn of fine denier filaments or fibers (e.g., 1.5 dpf or lower), with a textured yarn being preferred for relatively greater dynamic insulating effect, as discussed below. The loop yarn overall denier is typically in the range of about 70 denier to 300 denier, with a preferred count of about 150 denier. At the preferred count, the filament count range is from about 100 filaments to 300 filaments, therefore providing a denier per filament (dpf) of from 1.5 to 0.5, respectively. A relatively smaller dpf, e.g. 1 dpf, is preferred for relatively greater dynamic insulating effect, as will be discussed below. A preferred commercial loop yarn is a 150/132 denier textured polyester yarn of fine denier filaments or fibers with a dpf of 1.14, e.g. as available from UNIFI, Inc., of Greensboro, N.C.

The stitch yarn 14 forming the technical face 16 of the knit fabric body 12 can be also made of any type of synthetic or natural material in a textured or flat filament yarn, with a textured yarn being preferred for relatively greater dynamic insulating effect. The range of stitch yarn count denier is typically between about 50 denier to 150 denier. Where the loop yarn is 150/132 textured, the preferred stitch yarn count is about 100 denier, and the filament count ranges from about 34 filaments to 200 filaments, i.e. 100/34 to 100/200, resulting in dpf from about 3 dpf to 0.5 dpf, with relatively finer filaments being preferred, again, for relatively greater dynamic insulating performance. A preferred stitch yarn is 100/136 denier textured polyester with about 0.7 dpf, e.g. as available commercially from UNIFI, Inc. Another preferred yarn is 130/408 denier textured polyester with about 0.3 dpf, e.g. as available from Hyosung, Inc., of Seoul, Korea.

From these examples, it can be seen that, for achieving markedly improved dynamic insulating performance, use of a textured 150/132 loop yarn and a textured 100/136 stitch yarn is preferred.

In comparison, in a prior art double-face velour fabric article (100, FIG. 3) without the improved dynamic insulation performance of the present invention, a typical stitch yarn 102 is 70/34 denier filament textured polyester, with individual fiber fineness of greater than 2.0 dpf, e.g. as available commercially from UNIFI, Inc.

In a preferred method of the invention, the fabric prebody 12 is formed by reverse plaiting on a fine cut circular knitting machine (e.g., 28 cut). This is principally a terry knit construction, where segments 22 of the loop yarn 16 cover the stitch yarn 14 on the technical face 18 and loops 23 of the loop yarn 16 form loops 23 at the technical back 20 of the fabric prebody 12 (see FIG. 1).

The fabric prebody 12 is next subjected to finishing. During the finishing process, the technical face and technical back surfaces 18, 20, respectively, of the fabric prebody 12, with the segments 22 of loop yarn 16 overlying the stitch yarn 14 at the technical face surface 18 and the loops 23 formed at the technical back surface 20, go through a finishing process such as sanding, brushing and/or napping, to generate a velour 24, 26. The yarn fibers are raised at both faces of the fabric prebody 12 (FIG. 1), including the technical face 18 and the technical back 20, to form the velour 24, 26 at each face of the fabric body 30 of the double-face velour fabric article 10 (FIG. 2) of the invention. The fabric prebody 12 and/or fabric body 10 may also be treated, e.g., chemically, to make it hydrophobic.

Figure 12:
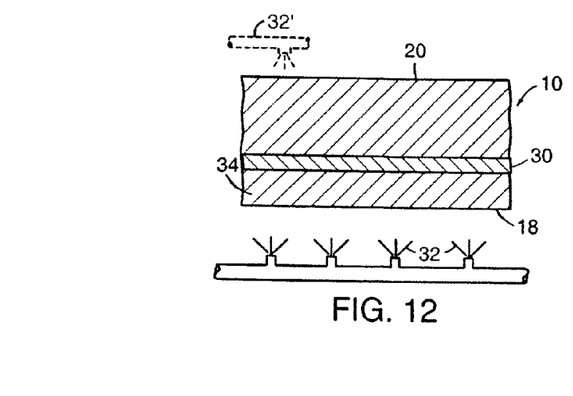
FIG. 12 is a somewhat diagrammatic end section view of a double-face velour fabric article being subjected to a process of hydroentanglement.

Referring to FIG. 12, after finishing, the fabric article 10 is next subjected to a process of hydroentanglement, such as employed in fabrication of spun staples yarn and in the fabrication of non-woven fabrics. During this process, fine, high-pressure water jets 32 (or air jets) are directed onto, e.g., the technical back 20 of the fabric article 10. In this manner, raised fibers 34 of the velour surface of the technical back 20 are entangled, including in and/or through interstices of the fabric body 30, toward the technical face 18. The hydroentanglement process thus serves to densify the velour surface, resulting in the double-face fabric article 40 (FIG. 13), advantageously, without substantial increase in bulk or thickness, for improved dynamic insulation, i.e. against through-flow of air, e.g., in a chilling wind. By way of example only, after finishing, the technical back 20 of a double-face velour fabric article 10 may be treated by hydroentanglement using fine, high-pressure water jets 32, e.g., with water applied at 100 msec to 350 msec through jets having apertures of 0.01 mm to 1.0 mm diameter. Alternatively, raised fibers of the technical face may be entangled in and/or through interstices of the fabric body, toward the technical back.

Figure 13:
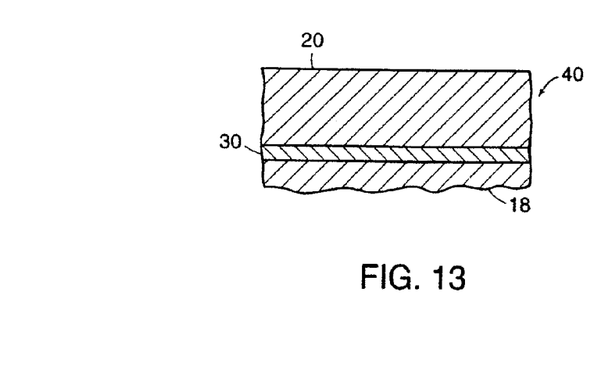
FIG. 13 is a similar, somewhat diagrammatic end section view of a resulting double-face velour fabric article of the invention, having improved dynamic insulation performance.

Entangling raised fibers of the technical back, i.e., of the loop yarn, including in and/or through interstices of the fabric body, toward the technical face, results in relatively greater densification and therefore greater tortuosity, e.g., as compared to entanglement of raised fibers of the technical face, including in and/or through interstices of the fabric body, toward the technical back. Entangling from back to face, in addition to resulting in a relatively greater increase in tortuosity, also increases smoothness of the fabric/garment outer surface, while entangling from face to back increases tortuosity and increases smoothness of the fabric/garment inner surface.

Fabric performance and aesthetics of the fabric article 40 can also be adjusted by selection of knitting gauge (e.g., in the range of about 18 to about 36, and preferably about 28), yarn type (e.g., preferably textured, or flat filament), yarn denier (e.g., about 70 to about 300, and preferably about 100), fiber denier (e.g., about 0.3 to about 1.5, and preferably about 1.0), etc. Adjustment of jet speed and/or aperture size, e.g., within the ranges mentioned above, can further or instead be employed to adjust fabric performance and/or aesthetics.

The fabric article 40 is thereafter heat set to stabilize the fabric article width.

In this and other embodiments of the invention described below, heat may be applied to the fabric body, e.g. dry heat and/or wet heat, such as hot water or steam, e.g. during finishing or dyeing. As mentioned elsewhere, the stitch yarn (and/or the loop yarn) may include heat sensitive and/or elastomeric materials.

Figure 2:
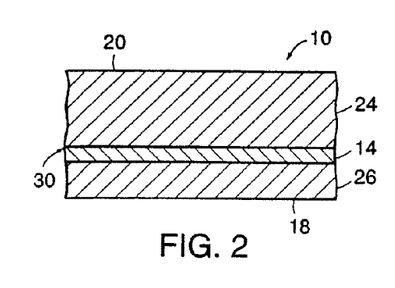
FIG. 2 is a somewhat diagrammatic end section view of a double-face velour fabric article of the invention formed by finishing the double-face fabric prebody of FIG. 1.
Figure 3:
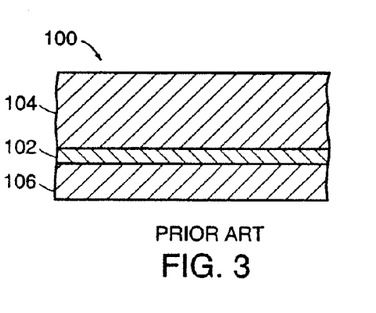
FIG. 3 is a somewhat diagrammatic end section view of a prior art double-face velour fabric article that is comparable to the double-face velour fabric article of FIG. 2.
Figure 4:
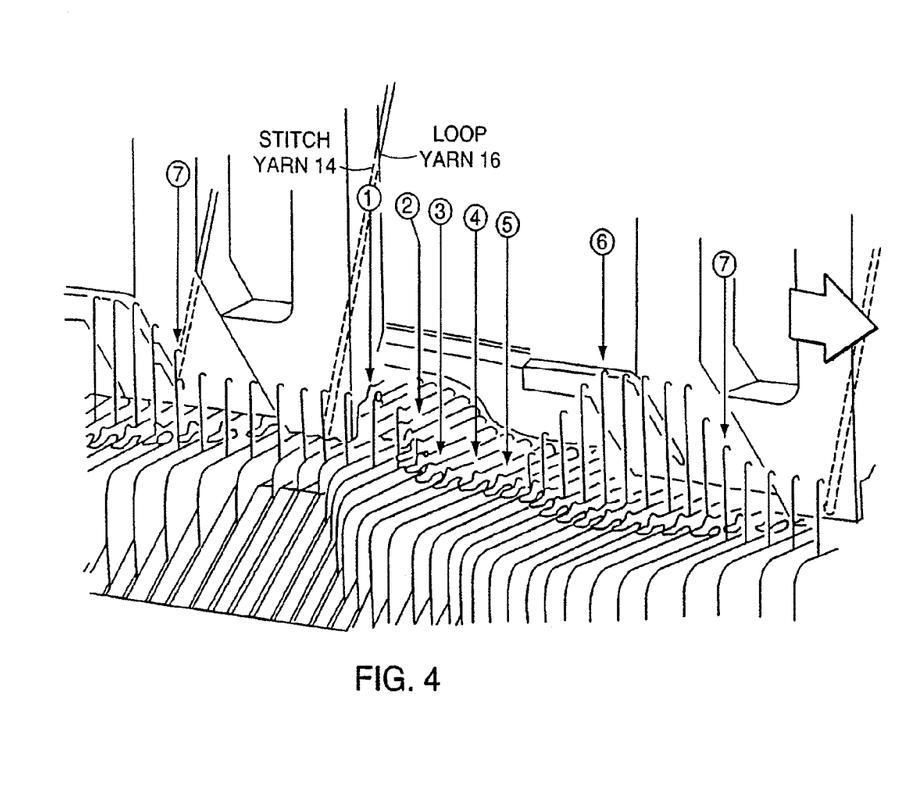
FIG. 4 is a perspective view of a segment of a circular knitting machine.
Figures 5, 6, 7, 8, 9, 10, 11:
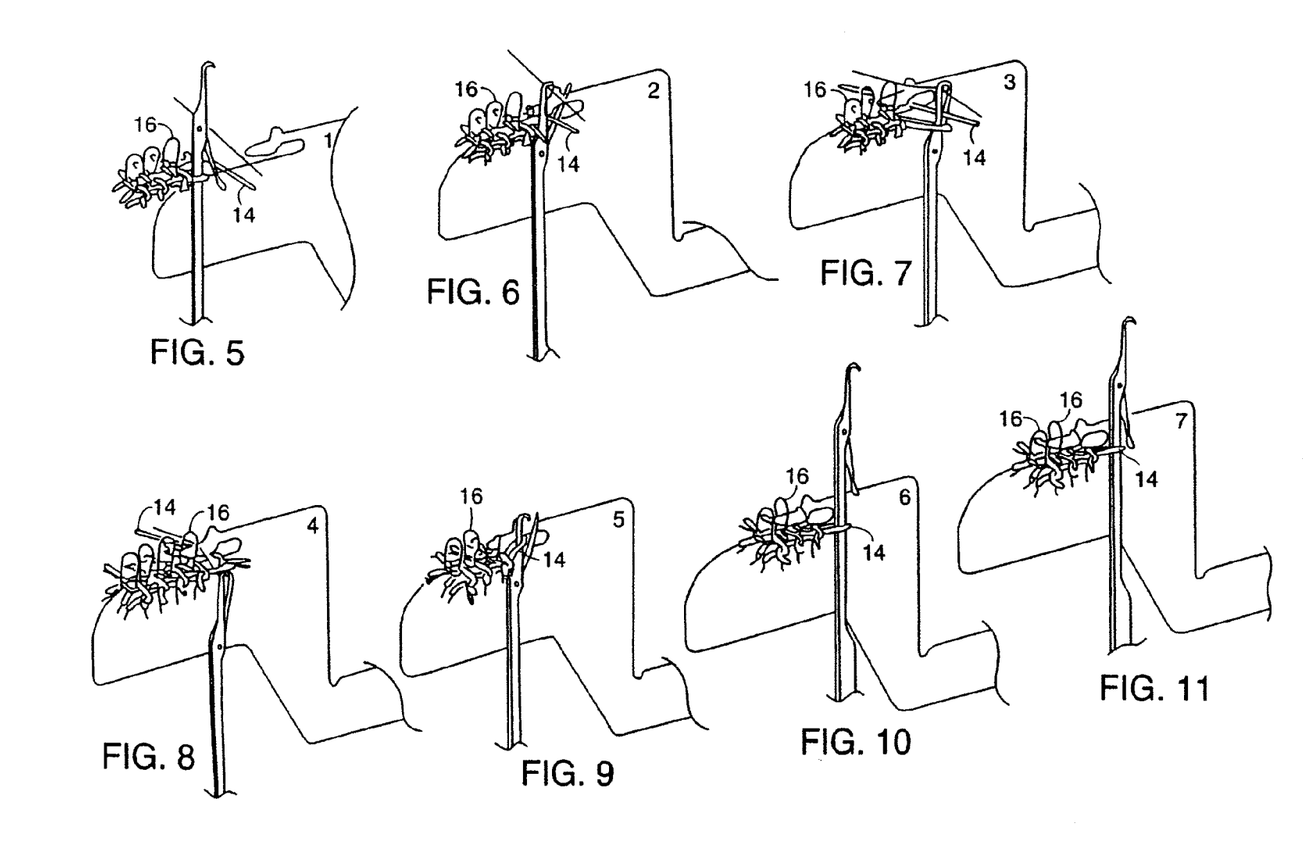
FIGS. 5-11 are sequential views of a cylinder latch needle in a reverse plaiting circular knitting process, e.g., for use in forming the double-face fabric prebody of FIG. 1.

In a resulting double-face velour fabric article 10 of this embodiment of the invention, the overall density, i.e., weight per length, of the filament stitch yarn 14 is closely comparable to stitch yarn 102 used in a comparable prior art fabric article 100 having velour 104, 106 at the opposite faces. The diameter of the filament stitch yarn 14 may be slightly greater than that of the prior art stitch yarn 102 (likely due to increased filament-to-filament engagement of the filaments of the filament stitch yarn 14). The yarn count and gauge of the double-face velour fabric article 10 of the invention are also substantially the same as those for the comparable prior art fabric article 100. As a result, the weight and stretch performance of the double-face velour fabric article 10 of the invention is closely comparable to the weight and stretch of the prior art double-face velour fabric article 100 of the same gauge and yarn count.

The fact that the weight density of the filament stitch yarn 14 and the stitch yarn 102 are the same indicates that the ratio of yarn material to open volume for each of the respective articles is also approximately the same. However, in the filament stitch yarn 14, and in the resulting double-face velour fabric article 10 of the invention, the average cross sectional area of the individual filaments is considerably less that the average cross sectional area of filaments in the stitch yarn 102 employed in the comparable prior art fabric article 100, e.g. the denier per filament (dpf) of the preferred filament stitch yarn 14 is about 0.7 dpf, as compared to 3.0 dpf for the stitch yarn 102 of comparable prior art fabric article 100. As a result, the paths for passage of air, e.g., a chilling wind, through double-face velour fabric article 10 of the invention, while relatively more numerous, are also considerably smaller and relatively more tortuous, as compared to a comparable prior art double-face velour fabric article 100. The enhanced performance of the fabric article of the invention is achieved by increasing the yarn count and the filament count to make the paths through the fabric more tortuous, thus making it more difficult for air, i.e., a chilling wind, to penetrate quickly through the double-face velour fabric article 10 of the invention. As a result, the dynamic insulation performance of the double-face velour fabric of the invention is dramatically increased over the prior art.

Figure 14:
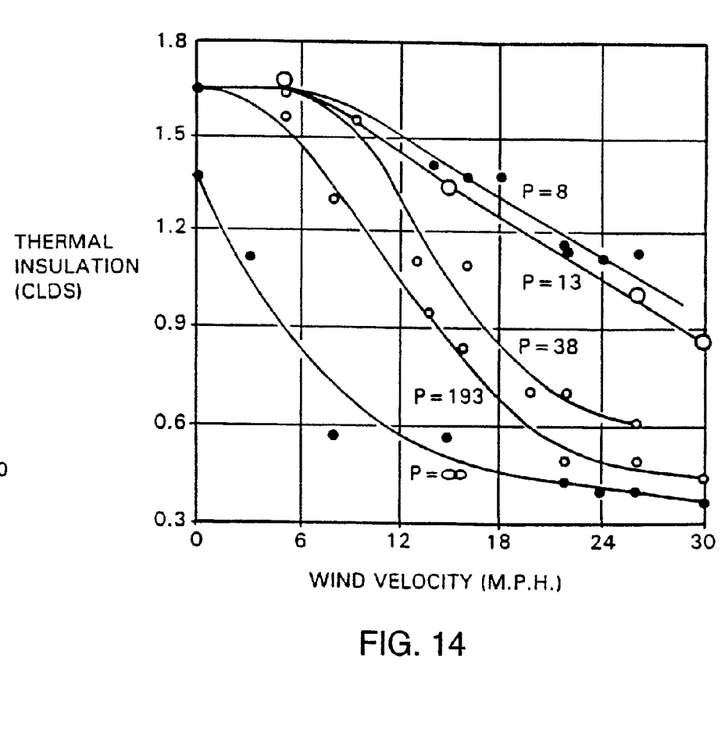
FIG. 14 is a plot of curves showing the relationship between change in effective thermal insulation and wind velocity for covers or fabrics of different permeability (P. Larose, "The Effect of Wind on the Thermal Resistance of Clothing with Special Reference to the Protection Given by Coverall Fabrics of Various Permeabilities," Canadian Journal of Research, Vol. 25, Sec. A, No. 4, (July 1947), pp. 169-190.).

In FIG. 14, there is reproduced a plot of curves showing the relationship between change in effective thermal insulation and wind velocity for covers or fabrics of different permeabilities, as appeared in an article by P. Larose, entitled "The Effect of Wind on the Thermal Resistance of Clothing with Special Reference to the Protection Given by Coverall Fabrics of Various Permeabilities," which appeared in Canadian Journal of Research (Vol. 25, Sec. A, No. 4, (July 1947), pp. 169-190), the entire disclosure of which is incorporated herein by reference. The permeabilities of the materials tested varied between 0 and 193 ft$^3$/ft$^2$/min under a pressure difference of ½ inch of water across the fabric.

In particular, it can be seen in the plot that at zero wind velocity there is relatively little difference in insulating performance among the materials tested. The dynamic insulating performance for each of the materials tested also decreased with increasing wind velocity. However, as may be seen in the plot, the rate of decrease in dynamic insulating performance was much more precipitous in fabrics of relatively greater permeability, i.e. as permeability increased, the rate of loss of dynamic insulating performance with increasing wind velocity was relatively smaller for fabrics of low permeability, as compared to fabrics having relatively greater permeability.

In Table A (below), the improvement in dynamic insulation performance of double-face velour fabric articles 10 (FIG. 2) of the invention in a chilling wind can easily be seen when compared to the performance of a comparable prior art double-face velour fabric article 100 (FIG. 3). In particular, the double-face velour fabric article 10 of the invention has considerably better dynamic insulating performance, and good static (no wind) and dynamic (windy) insulation performance, due to the increased tortuosity of air paths through the fabric, with good stretch properties and light weight.

TABLE A

|  | A1 | A2 | B1 | B2 |
|---|---|---|---|---|
| Loop Yarn | 150/100 textured | 150/132 textured | 150/100 textured | 150/132 textured |
| Stitch Yarn | 100/34 textured | 100/34 textured | 100/34 textured | 100/34 textured |
| Width | 58-inch cuttable | 58-inch cuttable | 54-inch cuttable | 54-inch cuttable |
| Dynamic Insulating Performance | 100-110 | 60-70 | 70-80 | 50-60 |

| Compare: | A1 to A2 | A2 has finer loop yarn, and therefore relatively better dynamic insulating performance. |
| Compare: | A1 to B1 | B1 has narrower width, and therefore better dynamic insulating performance. |
| Compare: | A1 to B2 | B2 has finer loop yarn, and therefore better dynamic insulating performance. |
| Compare: | A1 to B2 | B2 has finer loop yarn and narrower width, and therefore better dynamic insulating performance |

The word "tortuosity" is used to describe the fabric property enhanced according to this invention by increasing yarn count and filament count. The paths through the fabric are made more "tortuous" than those of prior art fabrics, and greater "tortuosity" results in greater dynamic insulating effect. In addition, if a given fabric body is subjected to less than normal stretching, resulting in reduced final width of the fabric (i.e., the width resulting after heat setting of the fabric during the finishing process), the higher, still, the dynamic insulating performance of the resulting fabric article of the invention.

In other preferred embodiments, fabric articles of the invention having relatively greater densification and tortuosity, and therefore increased dynamic insulation performance for enhanced protection from wind penetration, are achieved by incorporation of stitch yarns and/or loop yarns of predetermined selected characteristics. For example, stitch yarns and/or loop yarns including, or formed largely of, heat sensitive materials, e.g. hot melt or heat shrinkable materials, and/or elastomeric materials, such as spandex, may be employed.

Figure 15:
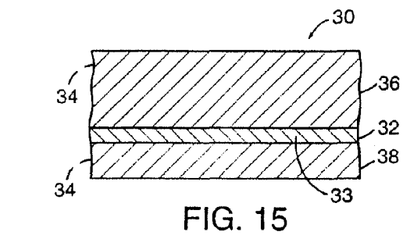
FIGS. 15-20 are somewhat diagrammatic end section views of other embodiments of double-face velour fabric articles of the invention formed of filament stitch yarns and/or filament loop yarns including or consisting largely of materials with characteristics selected for improving dynamic insulation performance of the fabric article, namely heat sensitive materials, elastic materials and/or combinations thereof.

For example, referring now to FIG. 15, in a preferred embodiment, a fabric article 30 of the invention formed by reverse plaiting on a fine cut circular knitting machine includes a stitch yarn 32 and a loop yarn 34 finished into a velour 36, 38 at the opposite surfaces. The stitch yarn 32 includes, or consists largely of, yarn or filaments of heat sensitive material 33, e.g. heat shrinkable material, or hot melt material (typically commingled (e.g., blended) with other fiber that will maintain yarn integrity after heat treatment). Suitable heat sensitive materials include polypropylene, polyester, polyamide, and the like, preferably with high shrinkage, e.g., about 5% to about 50% after about 2 minutes to about 60 minutes at about 212° F. to about 450° F. Heat is thereafter applied to the fabric article, e.g., dry heat and/or wet heat, such as hot water or steam, e.g. during dyeing and/or finishing. Upon exposure to heat, the hot melt material fuses to narrow or fill interstices between the yarns filaments, and the heat shrinkable material shortens and thickens, and/or reduces in effective length, thus to reduce the paths for passage of chilling wind through the fabric and thereby increase the tortuosity and the dynamic insulation performance of the fabric article 30 of the invention.

Figure 16:
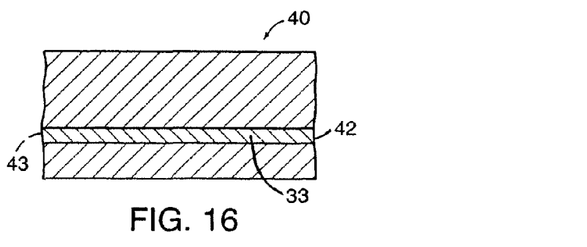

Referring next to FIG. 16, in another embodiment, in a fabric article 40 of the invention, the stitch yarn 42 comprises a cored yarn 43 having a core formed, e.g., of polyester or nylon, with a sheath formed of a heat sensitive material, e.g., a hot melt material, such as polypropylene, polyester or polyamide, e.g. as available commercially from Engineered Yarn Company, of Fall River, Mass. During heating of the fabric article of this embodiment, e.g. during dyeing and/or finishing, the hot melt material of the sheath fuses, thus increasing the tortuosity and further reducing the paths for passage of chilling wind through the fabric and improving the dynamic insulation performance of the fabric article 40 of the invention.

Figure 17:
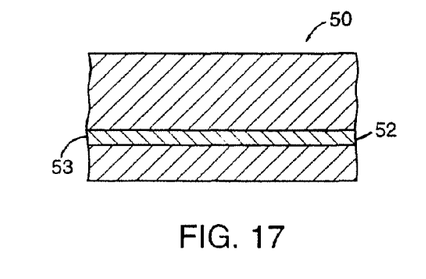

Referring now to FIG. 17, in a fabric article 50 of the invention, the stitch yarn 52 includes elastomeric material 53, e.g. such as spandex. The elastomeric material 53 in the stitch yarn 52 also provides for relatively greater densification and tortuosity, and therefore increased dynamic insulation performance for enhanced protection from wind penetration, as well as providing for fabric stretch and enhanced wearer comfort.

Figure 18:
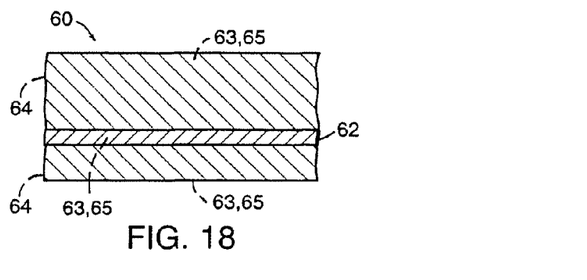

Referring now to FIG. 18, a fabric article 60 of the invention may also be formed of stitch yarns 62 including or consisting largely of combinations of heat sensitive materials 63 and elastomeric materials 65. For example, stitch yarns employed in the fabric article 60 may include fibers or filaments of different characteristics that have been commingled or plaited together.

Figure 19:
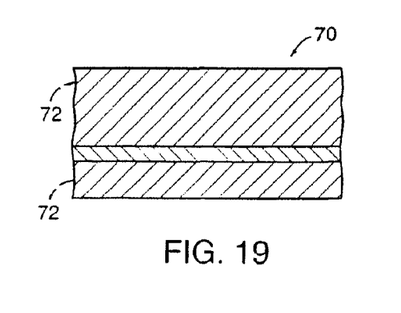

Referring to FIG. 19, in another embodiment, a fabric article 70 of the invention is formed of loop yarns 72 of standard denier that, upon application of heat, e.g., during dyeing and/or finishing, split axially into multiple, elongated fibers or filaments. The result is a reduction or narrowing of paths for passage of chilling wind through the fabric, to increase tortuosity and dynamic insulation performance of the fabric article 70. The loop yarns may be caused to split also by application, e.g., of a chemical treatment, e.g. caustic soda, or by application of a mechanical action, e.g. napping.

Figure 20:
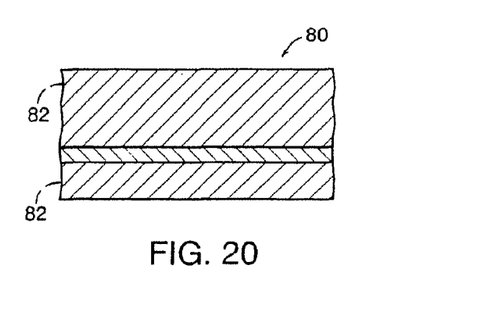

Referring finally to FIG. 20, in yet another embodiment, a fabric article 80 of the invention is formed of loop yarns 82 having an "islands-in-sea" construction. Namely, the loop yarns 82 are formed of a hot melt polymeric body ("sea") containing multiple filaments ("islands") of small diameter, e.g. 0.01 to 0.03 denier. Upon application of heat to the fabric article 80, e.g., during dyeing and/or finishing, the hot melt material melts to release the individual, small diameter filaments. Again, the release of the small filaments results in increased tortuosity and dynamic insulation performance of the fabric article 80.

Due to the increased tortuosity, including after heat treatment, a fabric article of the invention formed with stitch yarns including or consisting largely of heat sensitive materials and/or elastomeric materials, such as spandex, and/or loop yarns formed of heat sensitive materials and/or elastomeric materials such as spandex, and/or cored yarns having a sheath of hot melt material, have enhanced dynamic insulation performance, e.g. as compared to a prior art fabric article 100 (FIG. 3) having the same weight. As a result, the fabric articles of the invention are particularly suited for use, e.g., in lightweight clothing and the like for use in extreme conditions of chilling wind and cold temperature.

Examples of fabric articles of the invention formed with heat sensitive materials and/or elastomeric materials will now be described:

EXAMPLE 1

A fabric article of the invention, designated S/7380, was formed of a stitch yarn consisting of 150/34 POWER-STRETCH™ heat shrinkable textured polyester, available from UNIFI, Inc., and a loop yarn consisting of 150/132 textured polyester. After exposure to heat, the air permeability of the finished fabric article, tested according to ASTM-737, was 70 $ft^3/ft^2/min$.

EXAMPLE 2

Another fabric article of the invention, designated E555P, was formed of a stitch yarn consisting of 50/36 textured polyester with 20 denier spandex on every other end plaited with 50/36 textured polyester and a loop yarn consisting of 150/132 textured polyester. After exposure to heat, the air permeability of the finished fabric article, tested according to ASTM-737, was 59 $ft^3/ft^2/min$.

EXAMPLE 3

Yet another fabric article of the invention, designated E657Y, was formed of a stitch yarn consisting of 50/36 textured polyester commingled with 40/20 textured polypropylene and a loop yarn consisting of 100/96 textured polyester. After exposure to heat, the air permeability of the finished fabric article, tested according to ASTM-737, was 38-40 $ft^3/ft^2/min$.

EXAMPLE 4

Another fabric article of the invention, designated E667Q, was formed of a stitch yarn consisting of 100/34 POWER-STRETCH™ heat shrinkable textured polyester and a loop yarn consisting of 100/96 textured polyester. After exposure to heat, the air permeability of the finished fabric article, tested according to ASTM-737, was 60-70 $ft^3/ft^2/min$.

A number of embodiments of the invention have been described. Nevertheless, it will be understood that various modifications may be made without departing from the spirit and scope of the invention. For example, any type of yarn may be employed. Also, other suitable methods of constructing a velour fabric article of the invention may be employed. For example, in the preferred embodiment described above, the construction provided by reverse plaiting is employed in order to expose the loop yarn 16 for finishing at both surfaces of the fabric body, with segments 22 of the loop yarn 16 overlaying the stitch yarn 14 at the technical face 18 and formed into loops 23 at the technical back 20. This is preferred, for reasons of dynamic insulation performance, over a construction in which only the loop yarn is finished. However, where improvement of dynamic insulation performance is not the primary or an overwhelming consideration, a construction exposing the stitch yarn and the loop yarn side by side for finishing at one or both surfaces of a fabric body may be preferred. In embodiments of fabric articles of the invention formed with heat sensitive materials, heat may be applied other than or in addition to during dyeing and/or finishing, e.g., before, after, or between these stages of manufacture.

Also, referring again to FIG. 13, a double-face velour fabric article 40 of the invention may be formed by applying the hydroentanglement process to the technical face 18 and/or the technical back 20, e.g., using fine, high-pressure water jets 32 and/or 32', respectively.

As mentioned above, a fabric article with stitch yarn and/or loop yarn comprising heat sensitive and/or elastomeric material may also be entangled or hydroentangled according to the invention.

Accordingly, other embodiments are within the scope of the following claims.

What is claimed is:

1. A velour fabric article comprises a fabric body, having a technical face formed by a filament stitch yarn and a technical back formed by a filament loop yarn, said filament stitch yarn comprising heat shrinkable material and elastomeric material, said fabric body having a velour surface formed of said filament loop yarn at least at said technical back, and said heat shrinkable material of said filament stitch yarn of said fabric body responding to application of heat during processing to increase tortuosity of interstices of the fabric body with a result of said fabric body having permeability of about 80 ft$^3$/ft$^2$/min or less under a pressure difference of ½ inch of water across the fabric body.

2. The velour fabric article of claim 1, wherein said heat shrinkable material of said filament stitch yarn of said fabric body responds to application of heat during processing to shorten and thicken, thereby increasing the tortuosity of interstices of the fabric body.

3. The velour fabric article of claim 1, wherein said heat shrinkable material of said filament stitch yarn of said fabric body responds to application of heat during processing to reduce in effective length, thereby increasing the tortuosity of interstices of the fabric body.

4. The velour fabric article of claim 1, wherein said heat shrinkable material of said filament stitch yarn of said fabric body is selected from the group consisting of polypropylene, polyester and polyamide.

5. The velour fabric article of claim 1, wherein said heat shrinkable material of said filament stitch yarn of said fabric body responds to application of dry heat.

6. The velour fabric article of claim 1, wherein said heat shrinkable material of said filament stitch yarn of said fabric body responds to application of wet heat.

7. The velour fabric article of claim 6, wherein said heat shrinkable material of said filament stitch yarn of said fabric body responds to application of wet heat applied by steam.

8. The velour fabric article of claim 6, wherein said heat shrinkable material of said filament stitch yarn of said fabric body responds to application of wet heat applied by hot water.

9. The velour fabric article of claim 1, wherein said heat shrinkable of said filament stitch yarn of said fabric body material responds to application of heat at about 212° F. to about 450° F. applied for about 2 minutes to about 60 minutes.

10. The velour fabric article of claim 1, wherein said elastomeric material of said filament stitch yarn of said fabric body comprises spandex.

11. The velour fabric article of claim 1, wherein filaments of said heat shrinkable material and filaments of said elastomeric material, each of said filament stitch yarn of said fabric body, are commingled together.

12. The velour fabric article of claim 1, wherein filaments of said heat sensitive material and filaments of said elastomeric material, each of said filament stitch yarn of said fabric body, are plaited together.

13. The velour fabric article of claim 1, wherein raised fibers of the velour surface formed of said filament loop yarn at least at the technical back are entangled, including in and/or through interstices of the fabric body toward the other of the technical face and the technical back.

14. The velour fabric article of claim 13, wherein raised fibers of said filament loop yarn at the technical back are entangled, including in and/or through interstices of the fabric body, toward the technical face.

15. The velour fabric article of claim 1, wherein said filament loop yarn is textured.

16. The velour fabric article of claim 1, wherein said filament stitch yarn is textured.

\* \* \* \* \*